(12) United States Patent
Deng et al.

(10) Patent No.: US 8,370,490 B2
(45) Date of Patent: Feb. 5, 2013

(54) CLOUD SERVICE COST-OPTIMAL DATA CENTER ASSIGNMENT

(75) Inventors: Yu Deng, Hawthorne, NY (US); Michael R. Head, Hawthorne, NY (US); Andrzej Kochut, Hawthorne, NY (US); Jonathan P. Munson, Hawthorne, NY (US); Anca Sailer, Hawthorne, NY (US); Hidayatullah Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 12/829,189

(22) Filed: Jul. 1, 2010

(65) Prior Publication Data

US 2012/0005342 A1 Jan. 5, 2012

(51) Int. Cl.
*G06F 15/173* (2006.01)
*G06Q 30/00* (2012.01)
*G06Q 10/00* (2012.01)

(52) U.S. Cl. ........ 709/225; 709/226; 709/203; 709/216; 709/246; 709/223; 707/798; 705/34; 718/102; 726/22

(58) Field of Classification Search .................. 709/224, 709/225
See application file for complete search history.

(56) References Cited

U.S. PATENT DOCUMENTS

| 7,277,960 | B2 | 10/2007 | Andrezejak et al. |
| 7,426,570 | B2 | 9/2008 | Andrezejak et al. |
| 7,437,459 | B2 | 10/2008 | Chidambaran et al. |
| 7,437,460 | B2 | 10/2008 | Chidambaran et al. |
| 7,441,033 | B2 | 10/2008 | Chidambaran et al. |
| 7,516,221 | B2 | 4/2009 | Souder et al. |
| 7,552,171 | B2 | 6/2009 | Chidambaran et al. |
| 8,195,784 | B2 * | 6/2012 | Smith et al. ................... 709/223 |
| 2001/0014149 | A1 * | 8/2001 | Ooi et al. ................ 379/114.02 |
| 2006/0195607 | A1 * | 8/2006 | Naseh et al. .................. 709/238 |
| 2010/0107238 | A1 * | 4/2010 | Stedman et al. ................ 726/13 |
| 2010/0318454 | A1 * | 12/2010 | Warncke et al. ................ 705/37 |
| 2012/0005342 | A1 * | 1/2012 | Deng et al. .................... 709/225 |

* cited by examiner

*Primary Examiner* — Jude Jean Gilles
(74) *Attorney, Agent, or Firm* — F. Chau & Associates, LLC; Louis J. Percello, Esq.

(57) ABSTRACT

A method for service creation and mapping between at least two support systems includes provisioning a service based on a service requirement and a plurality of available data centers, collecting a value of the service requirement and a cost associated with the service, matching resource types of the data centers to resource availability, determining at least one valid data center from the plurality of data centers, and selecting a valid data center with a minimum cost for service placement and provisioning.

10 Claims, 4 Drawing Sheets

US 8,370,490 B2

CLOUD SERVICE COST-OPTIMAL DATA CENTER ASSIGNMENT

BACKGROUND

1. Technical Field

The present disclosure generally relates to cloud services, and more particularly to semi-automated service resource allocation.

2. Discussion of Related Art

Information technology (IT) clouds, implemented as virtualized data centers, have enabled new opportunities for the creation, deployment, management and usability of new services. Distributed users, from individuals to businesses, have been taking advantage of the cloud services automation and scalability benefits. However, the placement of services in data centers upon customer subscription is still dominated by intensive manual labor. Resource allocation in an ad-hoc way can challenge the service performance and cost savings.

Therefore a need exists for means for enabling a semi-automated service resource allocation.

BRIEF SUMMARY

According to an embodiment of the present disclosure, a method for service creation and mapping between at least two support systems includes provisioning a service based on a service requirement and a plurality of available data centers, collecting a value of the service requirement and a cost associated with the service, matching resource types of the data centers to resource availability, determining at least one valid data center from the plurality of data centers, and selecting a valid data center with a minimum cost for service placement and provisioning.

According to an embodiment of the present disclosure, a method for service creation and mapping between at least two support systems includes modeling requirements of a plurality of existing services, modeling an environment comprising the plurality of existing services, receiving a subscription request to a new service with parameters, creating a service model of the environment including the new service based on the parameters, accumulating data center level requirements from the service model, matching the data center level requirements against each a catalog and capacity of a plurality of data centers, discarding at least one data center of the plurality of data centers that does not fulfill the data center level requirements, accumulating a measure of cost for deploying the new service in each data center not discarded, and deploying the new service in at least one data center based on the measure of cost.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
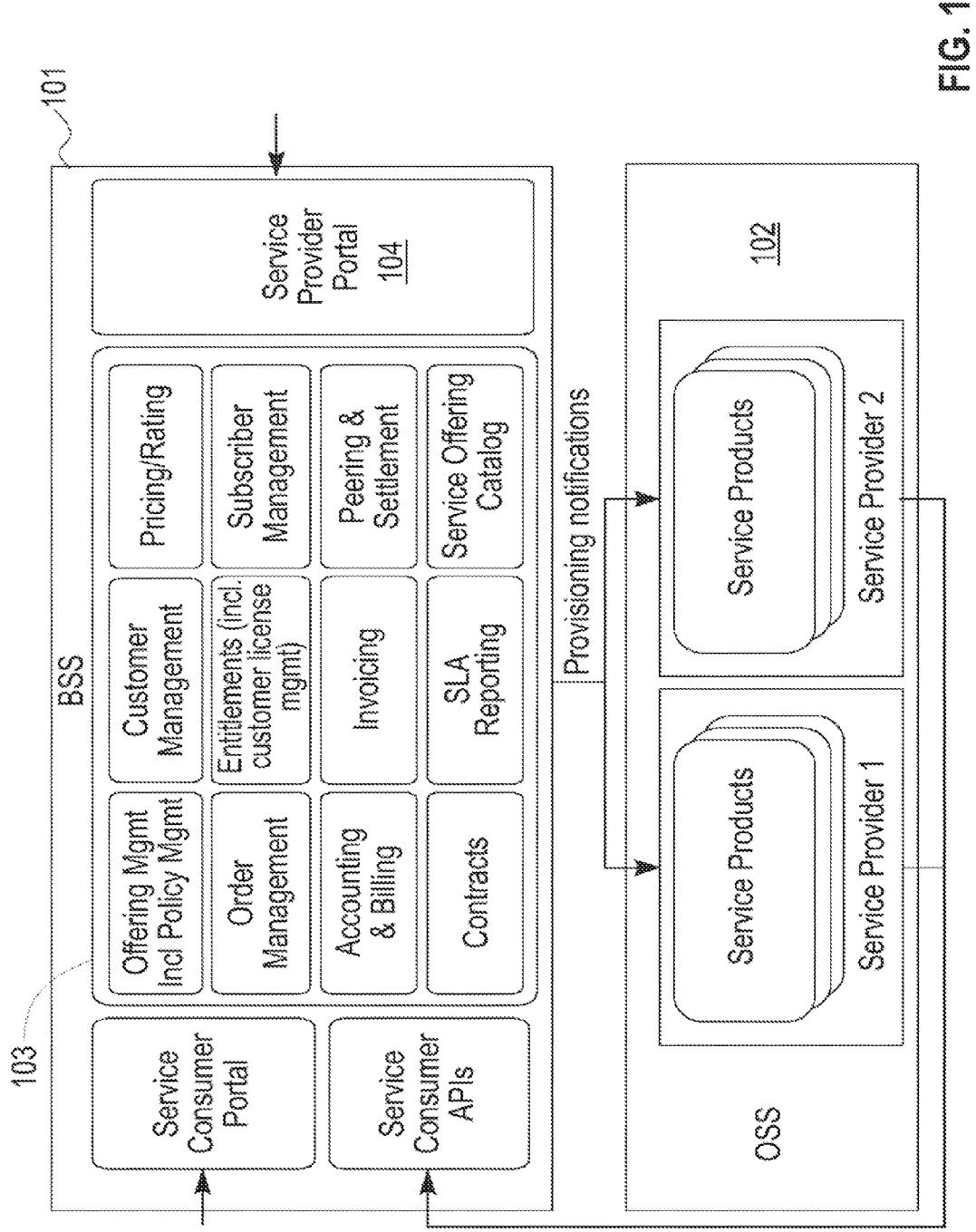
FIG. 1 shows a services framework composed of business support services (BSS) platform and operation support services platform (OSS)

According to exemplary embodiments of the present disclosure, resources may be allocated for in a cloud services environment.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1 and according to exemplary embodiments of the present disclosure, IT operations knowledge are identified and exposed at the leaf level of a graph in the form of basic services. The graph is extended by representing existing services offerings in terms of these operation level service definitions as well as simpler services offerings.

At service delivery time, upon customer subscription request, an exemplary embodiment of the present disclosure provisions the service based on the service requirements and the data centers availability.

The values of the service requirements and the costs associated with the different aspects of the service are collected.

Once all the service requirements are acquired, a matching process is performed against the data centers' resource types and availability and select the valid data center(s).

The valid data center (if any) with desirable cost, e.g., minimum cost, is selected for service placement and provisioning.

According to an exemplary embodiment of the present disclosure, cost maybe reduced through flexible sourcing and service operation placement.

An exemplary embodiment of a cloud services creation and deployment system based on graph mapping leveraging embodiments of the present disclosure is described below and illustrated in the FIGS. 1-3. Each item and the information processing involved during the operational phase of the system are described below.

A typical IT services framework is illustrated in FIG. 1, composed of a business support platform 101, namely Business Support Services (BSS), and an IT operation services platform 102, namely Operation Support Services (OSS).

The BSS 101 aid in operations involved in running a business, including customer management, order management, revenue management and product management.

The OSS 102 process requests from a BSS 101 for a data center. Such requests may include virtual machine creation and deletion, network and storage reservation and image management. In order to provide this service, it knows about the configuration and current state of the data center.

BSS and OSS platforms 101-102 are linked in the need to support various end to end services that are listed and described in the Services Catalog 103 in the BSS. The creation of these services is described in detail herein.

Different services may be placed differently on data centers depending on their particular requirements. At least two classes of services may be considered, leading to two complementary placement algorithms:

1. Application critical services (e.g., Desktop Service, Storage Service, Communication Service etc.): due to strict quality of service requirements (e.g., delay, jitter per customer), this class of services needs to model the service requirements per customer type at deployment time to identify potential customer locations given the data center positions.

2. Best effort services (e.g., Bulk processing services as in Billing Services, Componential Intensive Grid like Services): considering a PODs like data center deployment approach, the potential PODs locations can be identified given a customer location distribution.

In both classes, the IT requirements populated during the new service creation are subjected to the data centers' IT constraints (the matching process is detailed in the Formulation Section). For instance, a service requiring a CPU of $\{8\}$ will be rejected when matched against data centers providing CPU within the $\{2, 4\}$ values only. The OSS is required to acquire additional hardware to satisfy that new service. When all IT requirements of a new service have been validated as supported by OSS, the service is considered deployable and may be added to the BSS Services Catalog.

Service Subscription

Publishing a new service in the BSS Services Catalog makes it available for customers to subscribe to it. The actual resource allocation and provisioning take place at that time. Resource allocation in an optimal way is critical to service performance and cost savings.

Upon service subscription, the concrete values of the customer requirements and the costs associated with the different aspects of the service are collected. At that moment all the service requirements are populated and we can proceed with the matching process against the data center resource type and availability (see the matching algorithm details in the Formulation Section). By matching the customer requirements against the data centers availabilities, the valid data center(s) are selected. The valid data center (if any) with minimum cost is selected for service provisioning.

An exemplary embodiment of the present disclosure, considers the optimization algorithm described below for the Application critical services class.

Notation

A universe of objects may be represented as $V=\{C_i\}$, where the $C_i$ are objects that correspond to our Cloud services and sub-services, and our OSS resource types. Each $C_i$ object is given a type taking a value from a finite set T (e.g., for Cloud services T may include T={Desktop, WebHosting, Billing, Invoicing, ITManagement}, for OSS resources T may include T={VM,IP,Storage}). Each of these h types, $T_h$, has an associated set of attributes $ASet(T_h)$ (e.g., type Desktop has ASet(Desktop)={VMcount, storage, images, delay, Security, Billing, Invoicing, ITManagement}, type VM has ASet(VM)={CPU, RAM, DiskSize}, type Storage has ASet(Storage)={Size}), corresponding to the set of attributes of that object's requirements. $ASet(T_h)$ is a subset of a larger set A which encompasses all possible attributes. Each of the q attributes in A, $A_q$, has an associated value domain $Dom(A_q)$, e.g., $Z^+$ for most attributes, but it could be a finite set, $\Re$, or any appropriate set. The requirement rules on the attributes may be expressed as minimum values required by the node to provide the service.

In addition to the value domain, there is a relation "is-provided-by" which is annotated as "≦" (less than or equal to). Generally, this relation will be the numeric less than or equal to relation on the actual values (e.g., a VM with a CPU requirement of '2' "is-provided-by" a VM with '3' CPUs, because 2 is less than 3), but in some cases this may be the greater than or equal to relation (e.g., a latency requirement of '50' ms. can be "provided by" a link with latency of '25' ms). For aggregation and capacity planning purposes, each attribute must also have defined addition (+) and subtraction (−) operators and the condition(s) under which the aggregation takes place. The addition operator must be commutative, associative and preserve the "≦" relation ((a≦b^ c≦d)⇒(a+c)≦(b+d)). When the elements in the attribute value set are numeric, the standard definitions of plus and minus would normally suffice. Note that additional aggregation functions, such as Min, Max, or custom may be defined for certain attributes.

A Services Catalog directed acyclic graph G=(V,E) may be given, which expresses the potential relationships between objects in V, linking as well BSS and OSS. An example of such a graph is shown in as element 202 in FIG. 2.

Figure 2:
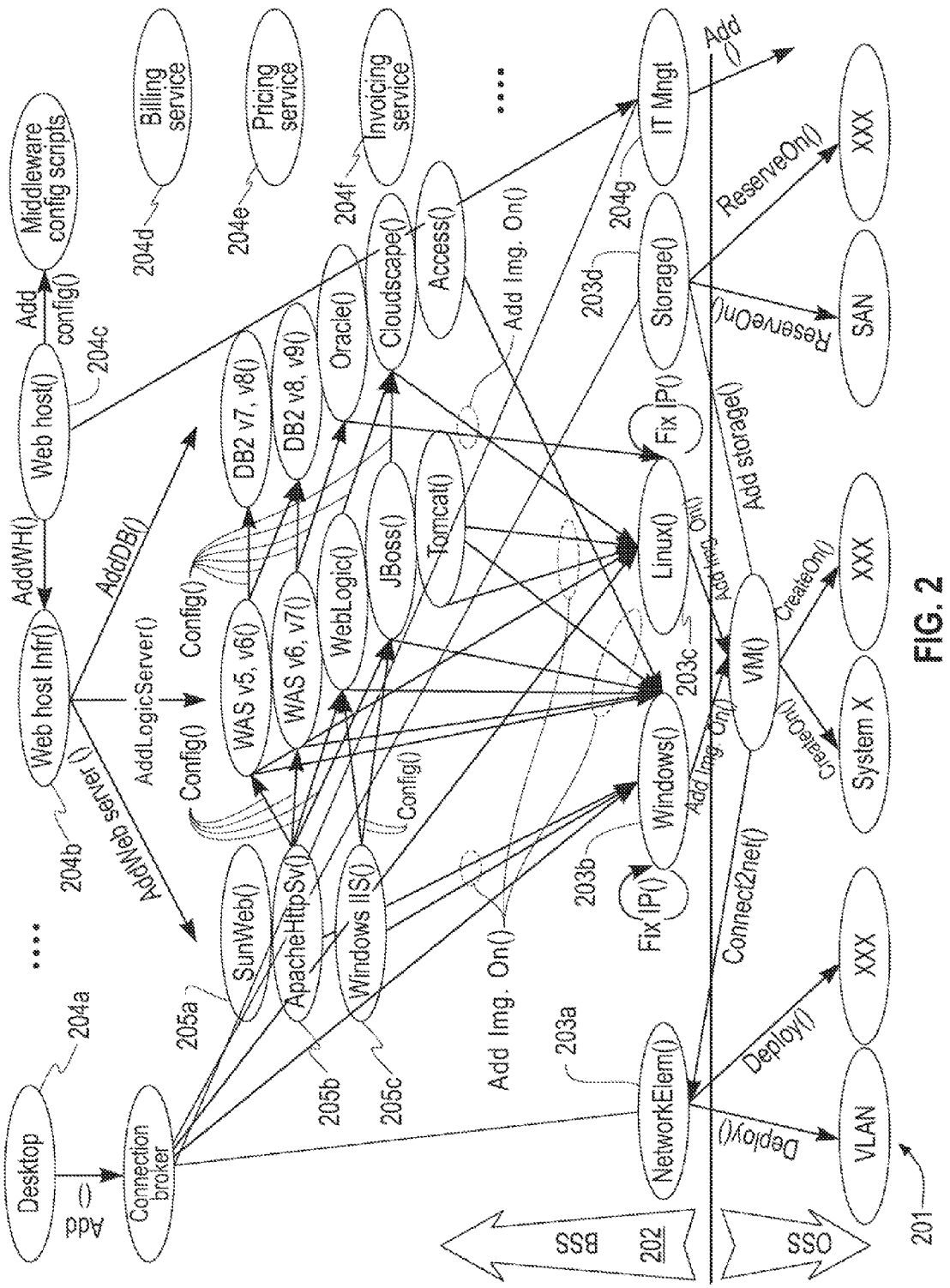
FIG. 2 is a cloud services graph as a support for service creation according to an embodiment of the present disclosure.

In FIG. 2 the IT configuration items characteristic of the OSS are represented as objects/nodes 201 of graphs at the OSS level and are exposed to the BSS in the form of basic services (e.g., objects/nodes 203*a-d*) as leaves of the BSS services graph 202. The BSS graph 202 includes extended service offerings (e.g., objects/nodes 204*a-g*) as composed of these operation level services as well as of the basic services offerings.

A new customer subscription service description may be constructed as a graph S=(V',E'). The S graph (e.g., objects/nodes 204*a-g*) expands the G graph's sub-graph that relates to the Cloud service a customer subscribed to, accounting for the customer's requirements. Thus, V' is a subset of V with some objects appearing zero or more times. That is, for any vertex v∈V, V' may have k copies of this vertex represented as $v^1, \ldots, v^k$, for some k. These are referred to herein as separate instances of the same object. Since a particular product may appear several times in the deployed service environment (e.g., there may be multiple virtual machines with Windows or multiple copies of WAS v6 running on different virtual machines), we use this concept of instances to distinguish them in the S graph. The relationships between the objects in V' follow the relationships established in the G graph for those objects.

Each attribute may be subject to rules that differ from one object to the other. The rules of an object in the G and S graphs need satisfy the related rules of that object's parent vertex. Each configuration implementing a rule is given a cost (zero or more) that reflects all costs associated with its attribute, for example, product costs, administration costs, downtime costs etc. Thus, the cost of an object is computed by considering all its rules' costs in view of their attribute aggregation function. We define a cost function called:

$$c: V \to \Re$$

Note that costs can be weighted to reflect the service or customer's preferences and criteria of optimization; e.g., if a customer requires that particular quality of services are more important then others, the corresponding QoS attributes will be given a higher weight. The cost function c is extended to the domain V', treating each instance identically as the original. Lastly, consider an edge cost function:

$$e: V \times C(V' \times V') \to \Re$$

which represents the cost of invoking the sub-services of the current service.

Note that c and e, similarly to the requirements, may be populated during the service creation time as well as during the deployment time for each data center participating in the placement optimization. Some costs may be available only at the data center (OSS) level (e.g., for hardware, software image management, etc.), while others are available only at BSS level (e.g., for software configuration). Additionally, costs may vary from one data center to another. In order to integrate this variability, the graphs as available in the Services Catalog do not contain the cost value itself; instead the rules are tagged (1 or 0) whether their cost is to be considered to the object's total cost or not. Thus, at subscription time, multiple S service graphs are generated, one for each valid (i.e., compliant with the service requirements) data center.

Problem Statement

Thus, resources may be allocated to a given new service (and its customer subscriptions) in one of multiple data centers. The constraint is placed upon the allocation is that the allocation cost should be minimized while the data center and services requirements are matched. More formally, to find the graph S that has a minimum total cost:

$$\sum_{v \in V'} c(v) + \sum_{u,v \in V'} e(u, v).$$

Matching processes according to an exemplary embodiment of the present disclosure may include a process for service deployment and a process for service subscription.

Each Cloud service attribute that has associated concrete values in the S graph is automatically aggregated down to the OSS resource type level. The aggregation is done by visiting each vertex associated with an OSS item, visiting all of its ancestors and edges in S, which is possible because S is a DAG, and accumulating each OSS attribute value associated with those vertices and links, respective to their types, using the attribute-specific addition aggregator when the aggregation condition(s) is(are) met. Each aggregated attribute is then associated with the starting OSS vertex. Only the OSS attributes are considered since they convey the data centers' cost differentiation, while the BSS aggregates have costs that are the same across the various services and as such have no impact on cost comparison or minimization.

Each S graph's aggregated requirements may be automatically compared to the data centers' constraint models (described here after), trying to match the resource type constraints for service deployment, and both resource type and availability constraints for service subscription.

If a requirement attribute or value is not present in a model, data center experts may manually populate that data center constraint model with the missing attributes and/or their values, or supply resources for unmatched requirements. For example, if delay is the attribute to be provided for a data center with respect to a given customer whose location is known, the response time of a typical transaction of the service may be estimated considering different types of infrastructure (at different costs). Once all requirements are validated, the matching process is considered approved and the service deployable or ready to provision.

Two resource constraint models are maintained for each data center, including a resource type based model and an availability based model. The first model inventories in a catalog the IT resource types belonging to a data center. This model is used both during service deployment as well as service subscription to identify whether all required IT resources are present in data centers, regardless whether utilized or not. The second model describes the resources availability and is used during service subscription to identify whether the service can actually be provisioned in data centers or not. Other types of constraints such as services dependencies and conflict as described herein are reflected in the S graph construction itself in the form of link presence or absence between vertices.

Formally, an OSS vertex v in the S graphs has a Type(v)∈T and a set of requirements req(v) element has an attribute Attr(req(v)$_i$)=$A_{v,i}$∈A, and an aggregated value Val(req(v)$_i$)= $Val_{v,i}$∈Dom($P_{v,i}$).

Each of the l data centers maintains a resource type catalog (DCat$^l$) represented as a set of j existing resources. Each resource, DCat$_j^l$∈DCat$^l$, has a Type(DCat$_j^l$)∈T, a cost Cost (DCat$_j^l$)∈ℜ and a set of k properties, Pset(DCat$_j^l$), each with an attribute Attr(Pset(DCat$_j^l$)$_k$)=$A_{j,k}^l$∈A(Type(DCat$_j^l$)) and a value Val(Pset(DCat$_j^l$)$_k$)=$Val_{j,k}^l$∈Dom($P_{j,k}^l$) associated with existing instances of that resource.

The service requirements aggregated at OSS level may be matched against what is provided by the data center catalog. The matching starts with the set of vertices representing OSS resources. For each OSS resource vertex v, find the subset DCat$_{match(v)}^l$ of all elements of DCat$^l$ whose type equals that of v. Given an OSS vertex v with Type(v), and set of i requirements req(v) each with $A_{v,i}$ and $Val_{v,i}$, and given a data center catalog DCat$^l$ with j resources each with Type(DCat$_j^l$), Cost (DCat$_j^l$), and a set of k properties Pset(DCat$_j^l$) each with attribute $A_{j,k}^l$ and value $Val_{j,k}^l$, find:

$$DCat_{match(v)}^l = \left\{ \begin{array}{l} DCat_j^l \in DCat^l : Type(v) = Type(DCat_j^l) \\ \wedge (\forall\, (i,k) \in \{i'; k': A_{v,i'} = A_{j,k'}^l\} : Val_{v,i} \leq Val_{j,k}^l) \end{array} \right\}.$$

Here, DCat$_{match(v)}^l$ is then a subset of DCat$^l$ that contains the catalog entries matching the requirements of vertex v.

If DCat$_{match(v)}^l$=⌀ for any OSS resource v∈S, then the service represented by S cannot be provided by the data center represented by DCat$^l$, and the data center associated with DCat$^l$ should not be considered for deployment. In case of unmatched requirements (i.e., the subset of req(v) whose attributes are not elements of P(T$_h$) for T$_h$∈T, or whose $Val_{v,i}$ are not within the related $Val_{j,k}^l$), they would be accounted manually here, with the elements of DCat$_{match(v)}^l$ having their costs updated as each unmatched requirement is filled in.

Each data center also maintains the capacity availability (DCat$^l$), represented as a set of m tuples, DCap$_m^l$∈DCap$^l$, each with a type Type(DCap$_m^l$)∈P(T$_h$) for some T$_h$∈T and a value Val(DCap$_m^l$)∈Dom(Type(DCap$^l$)). There is a tuple in the DCap$^l$ for all P(T$_h$) of each T$_h$∈T.

For provisioning validation, we create for each S graph a set of all possible collections of matched catalog elements. Each collection contains one matched resource type from each OSS vertex v's DCat$_{match(v)}^l$ set. In general, this set could be large, but in practice it is limited by the number of entries in the catalog, which is fixed. Thus the growth in size of this set is a polynomial function of S in the set O(|S||DCat$^l$|), with |DCat$^l$| being a constant. The resource capacity comprised in a collection is computed by aggregating each attribute in DCat$^l$ across the collection's resources. Collections that have aggregated attribute values that do not match the available capacity, i.e., are not "≦" the respective entry in DCat$^l$, are removed from the set of collections, thus, only the valid ones being retained. At that point we have selected the resource combinations, i.e., valid collections, which match the data centers availability and, thus, completed the provisioning validation.

Minimum Cost Computation

A cost model that associates cost to all resource types in the data center is maintained for each data center. A resource cost reflects all costs associated with its attributes, including product costs, administration costs, downtime costs etc. The cost computation involves three steps, one manual and two automatic. Assuming the service passed the matching process validation, the cost associated with each aggregated resource in the S graph is automatically populated from the corresponding data center cost model (covering both c and e functions). The resources remained without a cost associated in the S graphs after this step, are to be manually populated. An example of an attribute whose cost may not be available is the delay, for which the cost as a function of delay can be estimated, considering different technologies to ensure specific delay requirements. Each S graph is automatically traversed to collect all the costs and compute the total service cost.

Formally, after computing the cost of each valid collection by summing all the costs of resources of the collection, the collection in the set that has the lowest cost is chosen as the best selection of available catalog entries in data center l for the service: DCat$_{best}^l$. Each of the valid l data centers has its own DCat$_{best}^l$, and by comparing each data center's best cost, find the data center that can provide the service at the lowest overall cost.

After choosing the minimum cost data center l', update in DCap$^{l'}$ the available capacity for future new services, by subtracting for each attribute from its available capacity the service's resource usage of that attribute. Note that those skilled in the art may adjust this algorithm for different goals, for instance to allocate resources to a given new service in one or more of a service provider's data centers. It should be understood that minimum cost may be expressed in various ways, and may be replaced with other measures, such as fastest service, shortest distance, etc.

Post-Service Subscription

In case a customer needs to expend their service with additional resources, for instance due to increased load, the customer service graphs S are again generated and used to find the new placement based on the customer service graphs S and corresponding requirements R. Optionally, the costs in the data center that deploys currently the service for that customer can be weighted down to reflect a desire to expand the currently allocated resources and avoid migration to a new data center.

Similarly, in case of a service that includes dynamic resource allocation, such as the Web Hosting service, the S graph generation and optimization algorithm re-run take place each time the load breaches the load ranges as defined in the service load to resource mapping requirements.

Figure 3:
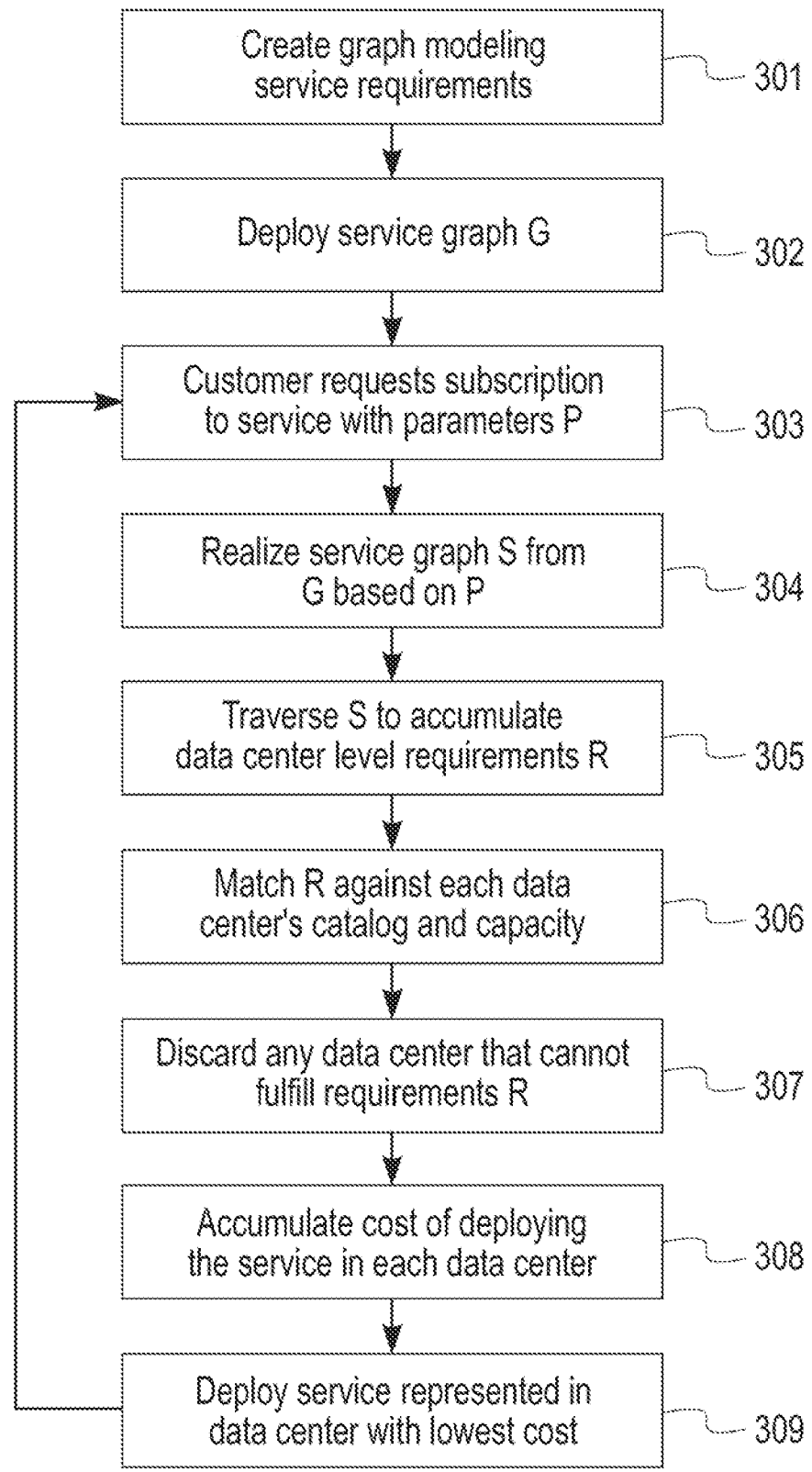
FIG. 3 is a flowchart of a method for cloud service data center assignment according to an embodiment of the present disclosure.

In view of the foregoing, and referring to FIG. 3, an exemplary method for service creation and mapping between at least two support systems may include the creation of a graph modeling a new service's requirements 301, the deployment of a service graph G 302, and the receipt of a subscription request to the service with parameters P 303. Further, the service graph S is realized from G based on P 304. Given graph S, accumulate data center level requirements R 305 and match R against each data center's catalog and capacity 306. The method includes discarding any data center that cannot fulfill requirements R 307, accumulating cost of deploying the service in each data center 308 and deploying the service represented in data center with lowest cost.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
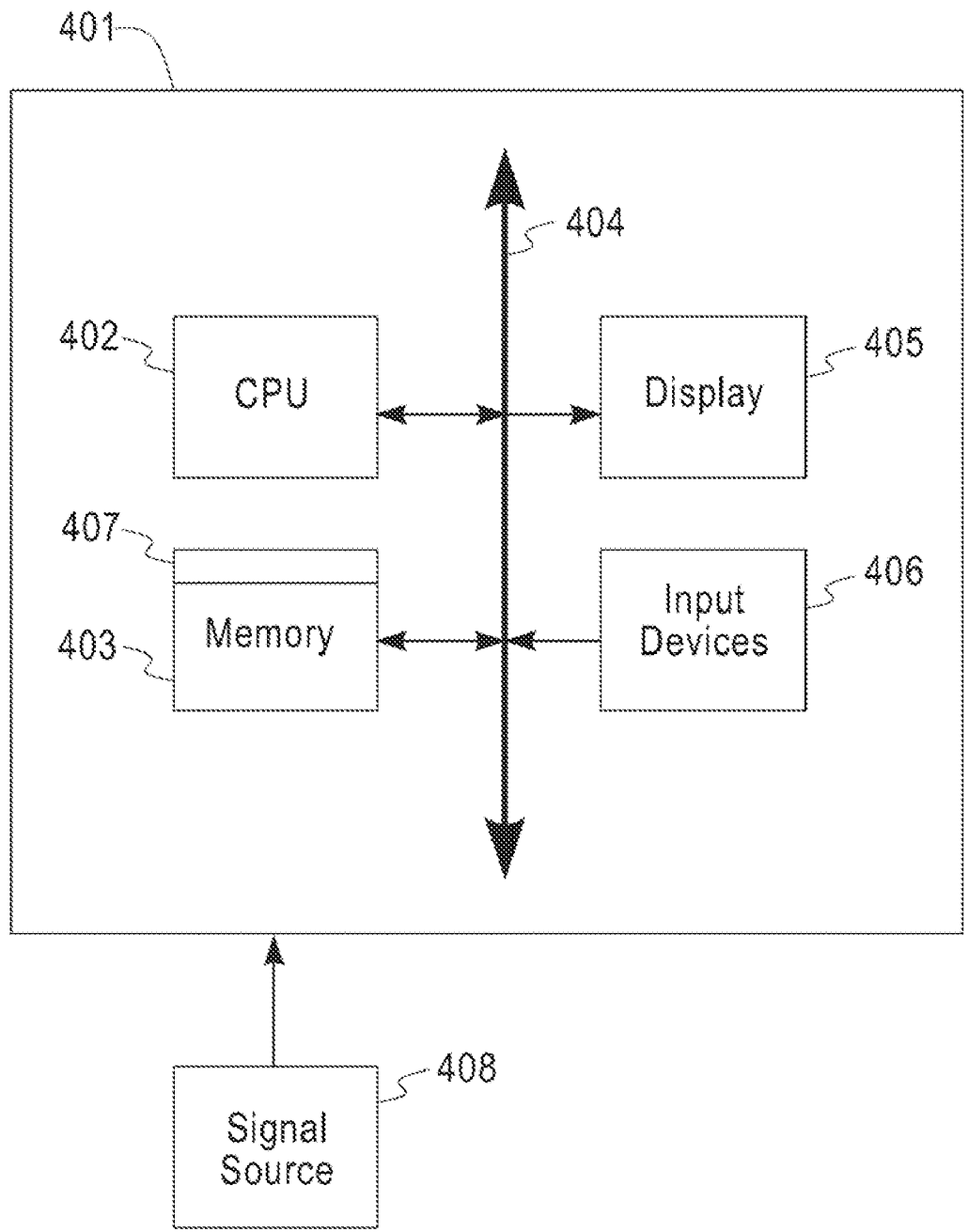
FIG. 4 is a computer system for implementing a method according to an embodiment of the present disclosure.

More particularly, referring to FIG. 4, according to an embodiment of the present disclosure, a computer system 401 for implementing a method for allocating resources in a cloud services environment can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 stored in memory 403 (e.g., a non-transitory computer-readable storage medium) and executed by the CPU 402 to process the signal from the signal source 408. As such, the computer system 401 is a general-purpose computer system that becomes a specific purpose computer system when executing the routine 407 of the present invention.

The computer platform 401 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described embodiments for semi-automated service resource allocation, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executed by a processor to perform a method for service creation and mapping between at least two support systems, the method steps comprising:

provisioning a service based on a service requirement and a plurality of available data centers;
collecting a value of the service requirement and a cost associated with the service;
comparing the service requirement to resource types of a plurality of data centers and resource availability of the plurality of data centers to determine a plurality of valid data centers among the plurality of data centers, the plurality of valid data centers having respective resource type and a respective resource availability matching all the service requirements; and
selecting a valid data center from among the plurality of valid data centers with a minimum cost for service placement and provisioning.

2. The computer readable medium of claim 1, wherein the at least two support systems include a business support system and an operations support system.

3. The computer readable medium of claim 1, wherein the provisioning is performed at service delivery time.

4. The computer readable medium of claim 1, further comprising maintaining a plurality of resource constraint models for each of the plurality of data center.

5. The computer readable medium of claim 4, wherein the plurality of resource constraint models include a resource type based model corresponding to the catalog and an availability based model corresponding to the capacity.

6. The computer readable medium of claim 1, further comprising maintaining a cost model for each of the plurality of data centers that associates a cost to a respective resource type.

7. A non-transitory computer readable medium embodying instructions executed by a processor to perform a method for service creation and mapping between at least two support systems, the method steps comprising:

modeling requirements of a plurality of existing services;
modeling an environment comprising the plurality of existing services;
receiving a subscription request to a new service with parameters;
creating a service model of the environment including the new service based on the parameters;
accumulating data center level requirements from the service model;
comparing the data center level requirements against each a catalog and capacity of a plurality of data centers to determine a plurality of valid data centers among the plurality of data centers, the plurality of valid data centers having a respective catalog and a respective capacity matching all the data center level requirements;
discarding at least one data center of the plurality of data centers that does not fulfill the data center level requirements;
accumulating a measure of cost for deploying the new service in each of the plurality of valid data centers; and
deploying the new service in at least one of the plurality of valid data centers based on the measure of cost.

8. The computer readable medium of claim 7, further comprising maintaining a plurality of resource constraint models for each data center.

9. The computer readable medium of claim 8, wherein the plurality of resource constraint models include a resource type based model corresponding to the catalog and an availability based model corresponding to the capacity.

10. The computer readable medium of claim 7, further comprising maintaining a cost model for each data center that associates a cost to a respective resource type.

* * * * *